Dec. 11, 1962 E. J. HERBENAR ETAL 3,068,031
BALL JOINT ASSEMBLY
Filed Aug. 10, 1959

Inventors
Edward J. Herbenar
Sylvester S. Mazur
Attys.

United States Patent Office 3,068,031
Patented Dec. 11, 1962

3,068,031
BALL JOINT ASSEMBLY
Edward J. Herbenar and Sylvester S. Mazur, Detroit, Mich., assignors to Thompson Ramo Wooldridge Inc., Detroit, Mich., a corporation of Ohio
Filed Aug. 10, 1959, Ser. No. 832,847
5 Claims. (Cl. 287—90)

This invention relates to a joint assembly and more particularly to a joint assembly having a socket which is provided with a resilient bearing secured thereto by a bonding agent and receiving a ball stud for rotatable and tiltable movement therein.

Heretofore, ball joints for wheel suspension systems or the like have required machining internally of their sockets, as well as end caps and machined seat constructions therefor. Means for supporting the head of the stud within the socket such as disks, spring and the like, have also been required.

The present invention represents a major advance over the constructions described in that internal machining of the socket is eliminated thereby, and the end cap and machined seats therefor are dispensed with as are the support means such as the spring and disk structures referred to. These advantages are provided by means of a bearing which is molded in one piece and which encloses the ball end of the ball stud except on the side into which the stud is assembled. The bearing of the invention is resilient and self-lubricating, and desirably is formed of a plastic such as polyurethane. Preferably, the internal configuration of the bearing is spherical and the external configuration thereof is frusto-conical.

The conventional end cap structure is dispensed with because the bearing encloses the lower end of the stud entirely. Thus the entrance of dirt or other foreign materials into the stud is substantially eliminated, and the bearing is bonded securely to a complementary frusto-conical socket wall by a material such as an epoxy resin or other suitable bonding agent.

In assembling the joint, the bearing or the socket wall is coated wtih the bonding agent and the ball head of the stud inserted into the bearing. The bearing is then placed in the socket and a suitable loading tool, having an active face complementary in shape to the end of the bearing, is pressed against the end of the bearing to effect a firm engagement of the bearing with the socket. A predetermined loading tool pressure is utilized for this purpose which is maintained until the bonding agent has set. The active face of the loading tool may have a central recess to accommodate convexity in the end or outer face of the bearing, and the bearing desirably has an annular shoulder for engaging the loading tool.

Means are provided for supporting the ball joint assembly during bonding which include a block which has a bore formed therein for receiving the stud, and an upper recess for supporting the socket in inverted position may also be formed so that load forces are transferred to the block along the inwardly converging wall of the socket. These forces may be in the neighborhood of 50 pounds in a preferred method of assembling the socket joint, and although the epoxy resin may be permitted to set at room temperature, it is preferred that a heat environment be utilized to shorten the setting time required.

Accordingly, it is an object of the present invention to provide a joint assembly wherein the socket requires no internal machining and is of an exceptionally economical construction.

Another object of the invention is to provide a joint as described which dispenses with the end closures heretofore required, as well as with the machining and rolling operations for such closures.

Another object of the invention is to provide a joint assembly having a bearing of resilient material which entirely encloses the head of a ball stud except at the portion adjacent the stud shaft and is effective to support the stud shaft within the socket of the joint.

Another object of the invention is to provide a bearing as described which resists forces directed downwardly on the stud shaft in a manner which eliminates the need for special spring and seat means for the stud head.

Another object of the invention is to provide a bearing which is secured to the internal socket wall by a bonding agent.

Another object of the invention is to provide a method of assembling the joint wherein the bearing is preloaded by a siutable loading tool to effect bonding of the bearing with the joint socket.

Other objects and advantages of the invention will become apparent as the description proceeds in accordance with the drawings in which.

Figure 1:
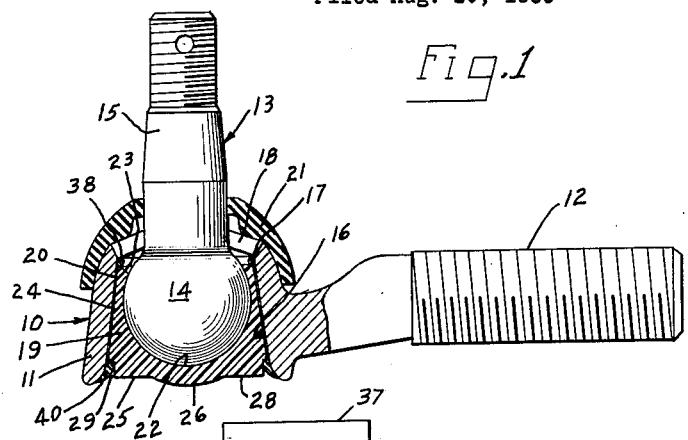
FIGURE 1 is a side elevational view, partly in vertical section, of a joint assembly according to the present invention.

Referring now to the drawings, the joint assembly 10 of the invention comprises an open-ended socket housing 11 having a laterally extending arm 12 integral therewith and which may be threaded or otherwise anchored to a meeting bracket or the like such as is carried on the upper or lower wheel suspension arm of a front wheel suspension for an automobile, although it will be understood that the joint 10 may be used in a wide variety of applications. A ball stud 13 has a ball end 14 rotatably and tiltably disposed in the socket housing 11 and a shank 15 which may be threaded for insertion into the eye of a wheel bracket or the like (not shown). The socket housing has a frusto-conical internal wall 16 converging inwardly at its end as indicated at 17 and defines a beveled opening 18 to accommodate the tiltable movement of the stud.

In accordance with the invention, a bearing 19 is seated in the socket housing 11 and is bonded thereto by a bonding agent 20, as hereniafter further described. In order to prevent the entry of dirt or foreign material into the socket through the opening 18, a seal cap 21 is mounted on the segmental spherical upper end of the housing so as to resiliently engage the stud shank in sealing relationship thereto.

The bearing 19 encloses the ball head 14 of the stud except at the end through which the shank 15 of the stud extends. Thus the bearing defines an internal surface 22 which is substantially spherical in configuration to afford rotatable movement of the stud and defines an opening 23 which is beveled as hereinafter described. The bearing 19 also defines an outer wall 24 of frusto-conical configuration, having a taper complementary to the tape of the inner wall 17 of the socket housing 11.

It will be seen that the bottom of the bearing 19 forms a closure wall 25 which may have a convexity 26 of the same radius of curvature as the internal wall 22 of the bearing, the material of the bearing at such convexity being of suitable thickness to insure that the stud will be retained against movement outwardly at all times. The closure wall 25 is also effective to prevent entry of dirt or other foreign material to the interior of the joint through the bottom thereof.

Figure 3:
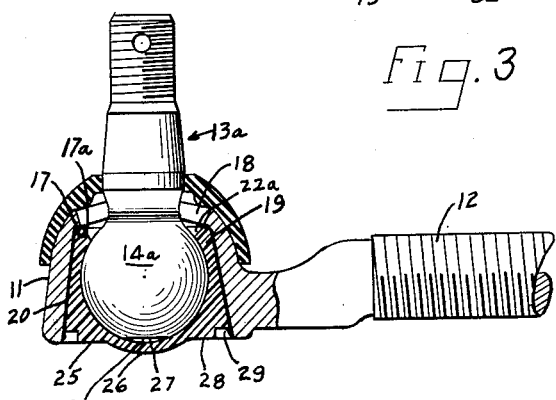
FIGURE 3 is a side elevational view, partly in vertical sections, of a second embodiment of the invention.

As seen in the embodiment of FIGURE 3, wherein similar parts are referred to by similar reference numbers, a stud 13a may be provided having a ball head 14a defining a flattened surface 27 opposite the convexity 26 of the bearing closure wall 25, thereby affording a segmental-spherical recess 27a such that the force exerted by the stud 13a is taken up in large part by the thickened peripheral portion of the closure wall. Thus in each embodiment, the bottom wall 25 of the bearing 19 substantially fills the bottom of the housing socket chamber and defines an annular shoulder 28 surrounding the segmentally spherical convexity 26, an annular recess 29 being formed at the lower outer portion of the bearing.

In accordance with the invention, the bearing 19 is of a resilient construction and thereby affords a cushioning means to protect the stud. It also affords a desirable spring action without the necessity for a separate spring element of the type used heretofore. To this end, and as hereinafter further described, the bearing is preloaded in the socket, preferably with a force of approximately 50 pounds, although variation in the specific loading force is encompassed within the scope of the invention. Desirably, a resilient plastic such as polyurethane is utilized for molding the bearing, this material being sold under a variety of trade names such as Vulkollan, Adiprene, Genthane, Elasticast or the like. As a result of the self-lubricating characteristic of this material, a greased-for-life socket is afforded which requires no repair or replacement, and eliminates the need for separate lubricating inserts and support seats.

Because of the elimination of such inserts and as a result of the permanent connection of the bearing 19 in the socket housing the internal wall 16 of the socket housing needs no internal machining nor does it require exceptionally accurate tolerances. The bearing is bonded to the wall as seen in FIGURE 1, by a bonding agent 20 which is preferably an epoxy resin, although other materials may be utilized within the scope of the invention. As a specific example of such a resin we refer to the materials known as "Palmer Epoxit No. PM–6003," a paste-type resin, and "Palmer No. PMH–728 Hardener." These materials are produced by Palmer Products, Inc., Worcester, Pennsylvania, and will set without the application of heat. However, a heat environment is preferred in setting the bonding agent to reduce the time required therefor, as hereinafter set forth.

Figure 2:
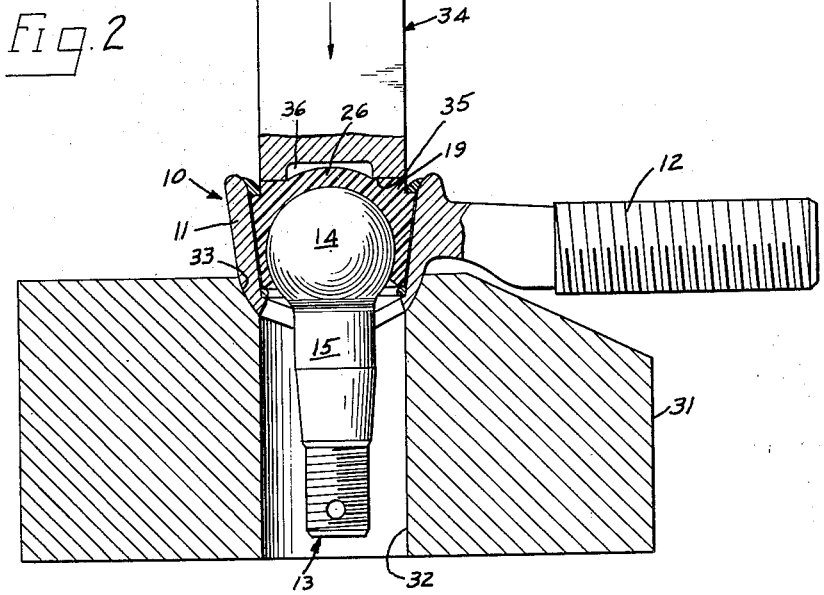
FIGURE 2 is a view corresponding to the view of FIGURE 1 showing means for assembling the joint.

In assembling the joint 10, the ball head 14 is placed in the bearing 19 and either the bearing wall 24 or the socket wall 16 is coated with the bonding agent. Thereupon the bearing 19, with the stud 13 retained therein is placed in the socket housing with the shank 15 of the stud extending outwardly of the joint as shown in FIGURE 2. In order to position the joint for application of preloading pressure to the bearing, a die block 31 may be provided, having a bore 32 formed vertically therein whose upper end is flared outwardly at 33 in an annular configuration which is complementary to the spherical segmental portions of the socket housing wall. Thus the socket housing is seated in this annular recess 33 with the stud depending downwardly, and spaced from the support surface for the die block 31.

A preloading force is utilized which is preferably in the neighborhood of 50 pounds as stated, to insure the complete insertion of the bearing in the socket to the fullest extent and to preload the bearing permanently. For this purpose a loading tool 34 is provided which may have a cylindrical configuration. The active face of the loading tool 34 includes an annular pressure shoulder 35 having a radial dimension approximating that of the annular shoulder 28 of the bearing 19. A recess 36 is formed centrally and coaxially in the action face of the tool so as to accommodate the convexity 26 in the bearing closure wall 25, as shown. The opposite face 37 of the tool may be planar to permit the even application of axial loading force by any suitable means (not shown), as indicated by the arrows 38, though other shapes may be used.

The tool 34 is thus positioned vertically and coaxially on the bearing closure wall 25 with the shoulders 35 and 28 in engagement and the desired constant force, e.g. 50 pounds, is applied to the tool until the agent 20 has set. In the embodiment of FIGURE 3, the bearing is shown as having a shoulder 17a pressed against the shoulder 17 of the socket and with its open end 22a tapering continuously with the socket opening 18. However, the bearing may also be positioned as shown in FIGURES 1 and 2, so that the bonding agent at the upper end of the bearing forms a bead 39 within the socket. The recess 29 in each embodiment may receive the bonding agent which is pressed upwardly during the application of loading force to the bearing, as indicated at 40. With bonding materials as described, setting may be accomplished in the neighborhood of an hour, for example, while this time may be reduced to approximately fifteen minutes with the application of heat.

There has thus been provided a ball joint of an unusual simplicity of construction and which can be assembled quickly and without the need for special skills or training. As the result of the elimination of the previous need for machining the interior of the socket, and of a seat for the socket closure, as well as the elimination of parts such as inserts, springs, seat closures and the like substantial savings in the cost of manufacture are afforded. And although the joint has been illustrated with respect to a ball stud type of construction, a resilient, self-lubricating bearing of the type herein set forth may also be effectively used in a wide variety of applications.

Although we have herein set forth and described our invention with respect to certain specific principles and details thereof, it will be understood by those skilled in the art that these may be varied without departing from the spirit and scope of the invention as set forth in the hereunto appended claims.

We claim as our invention:

1. A ball joint comprising a socket housing open at opposite ends thereof having an opening in one end being smaller than an opening in the other end, a bearing permanently and fixedly bonded in said socket housing and a ball stud having a ball head rotatably and tiltably retained in said bearing, said bearing substantially enclosing said ball head and having an opening in register with the opening in one end of said socket housing and closing the other end of said socket housing, said ball stud having a shank extending through said opening in said bearing and said opening in said one end of said socket housing, and said bearing forming a closure for said socket housing at the other end of said housing and said bearing being uncovered at said other end.

2. A ball joint comprising a socket housing open at opposite ends having an opening in one end and a larger opening in the other end, a resilient plastic bearing, a bonding agent bonding said bearing to an interior wall of said socket housing and a ball stud having a ball head rotatably and tiltably retained in said bearing, said bearing substantially enclosing said ball head and having an opening in register with the housing socket opening in said one end and said ball stud having a shank extending through the openings in said bearing and in said one end of said socket housing, and said bearing forming a closure for said socket housing at said larger socket housing opening and said bearing being uncovered at said larger socket housing opening end.

3. A ball joint comprising a socket housing having a frusto-conical interior wall and open at opposite ends with a small opening and a larger opening, a resilient unitary plastic bearing having an external wall complementary to the internal wall of said socket housing and permanently bonded thereto, said bearing having an internal spherical recess and an opening thereto in register with the smaller opening in said socket housing, and a ball stud having a ball head rotatably and tiltably retained in said spherical recess and a shank extending through said opening in said bearing and said smaller opening in said socket housing, said bearing forming a closure at the larger opening in said socket housing and said bearing being uncovered at said larger end.

4. A ball joint comprising a socket housing having a frusto-conical interior wall and open at opposite ends with a small opening and a larger opening, a resilient unitary plastic bearing having an external wall complementary to the internal wall of said socket housing and permanently bonded thereto, said bearing having an internal spherical recess and an opening thereto in register with the smaller opening in said socket housing, and a ball stud having a ball head rotatably and tiltably retained in said spherical recess and a shank extending through said opening in said bearing and said smaller opening in said socket housing, said bearing forming a closure at the larger opening in said socket housing and said bearing being exposed and uncovered at said larger opening, said ball head having a flat, segmental surface opposite said shank to transmit stress exerted axially in said ball stud to the peripheral portions of said bearing with said closure preventing entrance of contaminants to said spherical recess.

5. A ball joint comprising a socket housing open at opposite ends having a small opening end and a large opening end, a resilient, unitary plastic bearing permanently and fixedly bonded in said socket housing and a stud having a stud head retained in said bearing for relative movement with respect thereto, said bearing enclosing said head and having an opening in register with said small housing socket opening, and said stud having a shank extending through the opening in said bearing and said small socket housing opening, and said bearing forming a closure for said socket housing at said large socket housing opening and said bearing being uncovered at said large socket housing end.

References Cited in the file of this patent
UNITED STATES PATENTS

| | | |
|---|---|---|
| 1,867,540 | Rosenberg | July 12, 1932 |
| 2,027,560 | Skillman | Jan. 14, 1936 |
| 2,324,984 | Brown | July 20, 1943 |
| 2,350,398 | Hufferd | June 6, 1944 |
| 2,393,501 | Brown | Jan. 22, 1946 |
| 2,628,416 | Sampson | Feb. 17, 1953 |
| 2,835,521 | White | May 20, 1958 |
| 2,838,436 | Clingman | June 10, 1958 |
| 2,885,248 | White | May 5, 1959 |
| 2,912,267 | Latzen | Nov. 10, 1959 |
| 2,954,992 | Baker | Oct. 4, 1960 |